United States Patent
Martinez Vall et al.

(10) Patent No.: US 12,183,487 B2
(45) Date of Patent: Dec. 31, 2024

(54) COOLABLE SINGLE LINE AND CHARGING CABLE

(71) Applicant: BRUGG eConnect AG, Brugg (CH)

(72) Inventors: Albert Martinez Vall, Baden (CH); Tomasz Oslislok, Bad Zurzach (CH); Oldrich Sekula, Buchberg (CH); Hans Dietiker, Hunzenschwil (CH)

(73) Assignee: BRUGG ECONNECT AG, Brugg (CH)

( * ) Notice: Subject to any disclaimer, the term of this patent is extended or adjusted under 35 U.S.C. 154(b) by 595 days.

(21) Appl. No.: 17/275,993

(22) PCT Filed: Sep. 6, 2019

(86) PCT No.: PCT/EP2019/073886
§ 371 (c)(1),
(2) Date: Apr. 26, 2021

(87) PCT Pub. No.: WO2020/053104
PCT Pub. Date: Mar. 19, 2020

(65) Prior Publication Data
US 2022/0037056 A1 Feb. 3, 2022

(30) Foreign Application Priority Data
Sep. 14, 2018 (EP) .................................... 18194581

(51) Int. Cl.
*H02J 7/00* (2006.01)
*H01B 1/02* (2006.01)
*H01B 7/02* (2006.01)
*H01B 9/02* (2006.01)

(52) U.S. Cl.
CPC ............... *H01B 9/024* (2013.01); *H01B 1/02* (2013.01); *H01B 7/02* (2013.01); *H02J 7/0042* (2013.01)

(58) Field of Classification Search
CPC .......... H02J 7/0042; H01B 1/02; H01B 9/024
See application file for complete search history.

(56) References Cited

U.S. PATENT DOCUMENTS

| | | | |
|---|---|---|---|
| 9,824,794 B1 * | 11/2017 | McNutt | ................... H01B 7/04 |
| 2012/0199390 A1 | 8/2012 | Oka et al. | |
| 2014/0251652 A1 * | 9/2014 | Poulsen | ................ H01B 11/00 264/145 |

FOREIGN PATENT DOCUMENTS

| | | |
|---|---|---|
| CN | 106782835 A | 5/2017 |
| CN | 106849227 A | 6/2017 |
| CN | 106887277 A | 6/2017 |
| CN | 105845271 B | 6/2018 |

(Continued)

*Primary Examiner* — Robert Grant
(74) *Attorney, Agent, or Firm* — Birch, Stewart, Kolasch & Birch, LLP

(57) ABSTRACT

A single line (6) for a charging cable comprises an open support structure (011, 012) with a longitudinal extent, a conductor braid (2) composed of conductors and an insulating element (3). The conductor braid (2) directly covers the open support structure (011, 012) along its longitudinal extent. The insulation element (3) covers the open support structure (011, 012) and the conductor braid (2). There is at least one duct (4) for a cooling fluid (5) in the single line (6). This duct (4) is formed by the support structure (011, 012) and the conductor braid (2). The insulation element (3) cannot be penetrated by the cooling fluid (5) and is electrically insulating.

20 Claims, 5 Drawing Sheets

(56) References Cited

FOREIGN PATENT DOCUMENTS

| | | |
|---|---|---|
| CN | 108320846 A | 7/2018 |
| DE | 20 2015 009 531 U1 | 4/2018 |
| EP | 0 751 536 A2 | 1/1997 |
| EP | 3 179 485 A1 | 6/2017 |
| FR | 943.162 A | 3/1949 |

\* cited by examiner

COOLABLE SINGLE LINE AND CHARGING CABLE

TECHNICAL FIELD

The invention relates to a single line for a charging cable, to a charging cable with such single lines, to a charging system in which the charging cable is used and to a method for charging an energy store, in particular of a drive battery of a vehicle, in which a charging cable according to the invention is used.

PRIOR ART

CN 1 06 782 835 A (Shenzhen Baoxing) describes a vehicle charging cable. It comprises flexible hoses composed of an electrically insulating material through which a cooling fluid can circulate. The hoses run in the interior of the current-transmitting conductor arrangement.

A similar approach, that is to say to use hoses or pipes in the interior of the conductor arrangement, is also proposed in U.S. Pat. No. 2,012,199 390 A1 (Hitachi Cable) and CN 1 06 849 227 A (Shenzhen Woer).

These arrangements have the disadvantage that the heat which is produced in the conductor arrangements has to be conducted through the hose material before it can be transported away by the cooling fluid. The cooling is carried out with a delay and less efficiently.

In contrast, CN 1 06 887 277 A (Jiangsu Shengbide Special) and DE 20 2015 009 531 U1 (Porsche) permit a cooling fluid to run past on the outside of the conductor arrangement, since the contact face is larger there and the outputting of heat can therefore be more efficient.

Such arrangements have the disadvantage that the cooling can easily be interrupted if pressure loads the cable from the outside. Particularly in the case of charging cables for vehicles such as, for example, passenger cars, there is the risk of a person or a vehicle standing on the cable and pressing on the coolant duct. If the coolant duct is reinforced in order to prevent this problem, the cable has to correspondingly become thicker and therefore becomes less easy to handle.

SUMMARY OF THE INVENTION

A charging cable is intended to be configured in terms of its diameter such that a human can easily grasp it, that is to say is to have a diameter which is as small as possible, of preferably less than 5 cm. The cable is to be as flexible and lightweight as possible in order to be easy to handle. Furthermore, it must not heat up to such an extent that it is unpleasant to hold for the user. Above about 40° C. surface temperature it becomes very unpleasant to grip an object, for example a charging cable. The cable must be robust and must tolerate being driven over by a car. In addition to all these requirements, the charging cable must be able to transmit high currents. The currently customary charging current is 200 A. However, it is perfectly conceivable that in the relatively near future higher current will also need to be transmitted, specifically in particular up to 700 A. It is therefore desirable to make available a cable which can be operated in a way which is adapted to the current to be transmitted.

The object of the invention is to provide a single line which is associated with the technical field mentioned at the beginning and which is lightweight and flexible and nevertheless can transmit heavy currents without becoming unpleasantly hot. A cable in which such single lines are installed can also be made lighter in weight and more flexible than a comparable cable with different types of single lines.

The solution to the problem is defined by the features of claim 1. According to the invention, a single line for a charging cable comprises an open support structure with a longitudinal extent, a conductor braid composed of conductors and an insulating element. The conductor braid directly covers the open support structure along its longitudinal extent. The insulation element covers the open support structure and the conductor braid. In the single line for a charging cable there is at least one duct for a cooling fluid. This duct is formed by the support structure and the conductor braid. The insulation element cannot be penetrated by the cooling fluid and is electrically insulating. The conductor braid can preferably be penetrated by the cooling fluid.

Since the cooling fluid can enter directly into contact with the conductor arrangement through the open support structure, the cooling is very efficient: on the one hand the heat does not have to be conducted through a hose or some other type of separating layer, and on the other hand a conductor braid has a larger surface than the inner side of a circular cylinder, by which a hose can be approximated.

The conductor arrangement comprises the conductor braid and if appropriate further conductors of the single line which are in electrical contact with the conductor braid.

An internal cooling duct is also better protected against being pressed down than an external sleeve.

Until now it has virtually been impossible to implement internal, open cooling ducts in flexible cables: the conductors of a power cable are typically stranded or twisted. If wires are stranded or twisted around an open support structure, it is very easy for these wires to slip into the support structure and at least partially block the structures which are actually provided as ducts. The invention solves this problem by surrounding the support structure with a conductor braid. Such conductor braids are known, for example, from cable screening elements, but have previously not been used to transmit relatively high powers.

The conductor braid can itself already form a hollow cylinder. However, the internal diameter of such a hollow cylinder which is formed by a conductor braid changes if it is stretched or compressed along its longitudinal axis. Since a charging cable is intended to be flexible, a conductor braid without a support structure would constitute a hollow cylinder with internal diameters which change and are also very small under certain circumstances. This would make reliable cooling virtually impossible to achieve. The support structure ensures that the internal diameter always has a certain minimum value. Furthermore, it increases roll-over resistance of the single line: since compressive forces acting on the conductor are partially absorbed by the insulation and the conductor braid and are distributed spatially to a certain extent by the latter, the local loading on the internal support structure is lower than in the case of a support structure which is located outside the conductor arrangement. The support structure can be constructed with such a degree of stability as is necessary to be able to withstand the desired forces.

An open support structure is an elongate structure whose convex sheath is in the form of a cylinder, wherein at least one continuous duct, that is to say a duct which is not interrupted by the structure, runs in the interior of the convex sheath. When this consideration is adopted, the support structure is preferably assumed to be infinitely extended in its longitudinal direction.

An example of an open support structure is a helix composed of a round wire with a wire diameter d and with a thread pitch h, which is larger than the wire diameter d.

In this case, the convex sheath is a circular cylinder. The duct also constitutes a helix and runs offset with respect to the wire around half the thread pitch h. The width of the duct is equal to the thread pitch h minus the wire diameter d. This duct is not interrupted by the support structure. According to the invention there is therefore an open support structure.

Another example is an open profile which is cross-shaped or star-shaped in cross section: the convex sheath is in this case a cylinder with a rectangle or a polygon as a base surface. The ducts, there are more than one, run parallel to the longitudinal axis of the cylinder or of the profile. According to the invention there is also therefore an open support structure here.

A hose or a tube are, on the other hand, not open support structures since the duct which is formed by them does not run along their convex sheath but rather runs completely within it.

On the other hand, if the hose or the tube has openings in its side wall, the duct runs along the convex sheath at least in the region of these openings. The support structure is therefore then an open one.

According to this invention, conductors are elongate and are composed of electrically conductive material. Conductors can be, for example, wires or straps made of metal. Conductors are preferably composed of a material which has good conductivity, wherein they can be coated. A material with good conductivity preferably has a specific resistance of less than $10^{-5}$ Ωm at 20° C. The coating can protect, for example, against corrosion. The coating is preferably also to be conductive, but it can be less conductive than the material which has good conductivity. A coating is in particular thinner than 100 μm here.

A braid, and therefore also the conductor braid, is a product which is generated by regularly crossing over the conductors above and below one another. The conductors can intersect at an angle of 90° or at a different angle here. The braid can form a planar surface or mat, that is to say can expand as far as desired in two dimensions, or can be present in a shape similar to a cylinder, which expands as far as desired in just one dimension and is limited in the two other spatial dimensions. The conductors preferably intersect at an angle which is unequal to 90°, and the braid forms a cylinder-like shape.

The term "directly cover" is to be understood here and below as meaning in particular that no further layers or structures are provided between what is covered and what forms the cover. In this context, hollow spaces and/or cooling fluid are not to be considered as a layer or structure.

The term "cover" is to be understood as meaning here and below in particular that there definitely can be further layers or structures between what is the covered and what forms the cover, but these layers or structures do not necessarily have to be present.

According to this invention, electrically insulating is to be understood as meaning in particular a material with a specific resistance of more than $10^5$ Ωm, preferably of more than $10^{10}$ Ωm. The invention can utilize, in particular, ethylene-propylene diene rubber (EPDM) and/or thermoplastic elastomers (TPE) as insulating materials.

The conductor braid can be capable of being penetrated by the cooling fluid even though the conductors themselves cannot be penetrated by said fluid, since in the braid there are intermediate spaces between the conductors. Such a braid with intermediate spaces, which braid can be penetrated by the cooling fluid, has the advantage that the contact face between the cooling fluid and the conductors can be significantly increased and therefore the heat can be output efficiently to the cooling fluid. Furthermore, a braid with intermediate spaces is more flexible, which increases the flexibility of the single line overall.

The insulation of the single lines is preferably somewhat elastic so that during operation it can easily widen under the pressure of the cooling fluid. Under the operating pressure of the cooling fluid this widening, measured as the external radius of the insulation, is in particular not more than 10% of the external radius in the absence of cooling fluid. The insulation can be composed in particular of EPDM or TPE.

In one embodiment, the conductor braid is surrounded by further conductors along its longitudinal extent. These further conductors are in electrical contact with the conductor braid. The further conductors are either present themselves as one or more braids and are arranged coaxially around the conductor braid or the further conductors are twisted around the conductor braid. These conductors and conductor braid together constitute the conductor arrangement.

It is also possible that there are some conductors which are arranged in braids which are positioned coaxially with respect to the conductor braid, and other conductors are either twisted around the conductor braid or a further braid between the braids, or are twisted around all the braids.

In order to be able to transmit heavy currents, the single line should have a certain conductor cross section. A conductor braid which is flexible and easy to manufacture is however preferably composed of conductors which are not too thick. Increasing the conductor cross section by using relatively thick conductors is therefore practical only in certain limits. A relatively thick conductor is to be understood here as meaning in particular a conductor whose diameter is larger than 2 mm in every direction. An increase in the conductor cross section is easier to achieve by arranging further conductors around the conductor braid which covers the support structure.

These conductors can also be arranged as braids, which has the advantage that the conductor braid and the conductor layers above them can be easily approximated to one another in respect of properties such as flexibility and permeability to cooling fluid and furthermore only one braiding machine is required for the manufacture.

On the other hand, braiding during manufacture is more costly than the twisting of conductors which is customary for lines. Since the conductor braid protects the duct for coolant against twisted conductors slipping into it, further conductors can be twisted onto the conductor braid without the duct being also adversely affected.

The term conductor cross section is meant to refer herein and below to the entire cross-sectional area which is taken up by conductors in the cross section of the respective line. If a line or a cable therefore comprises for example three wires as conductors, which each have a circular cross section with a radius r, the conductor cross section of this line or this cable is $3\pi r^2$. If the conductor cross section cannot be derived from such geometric considerations, a sample piece of the cable or of the line with a known length is taken. The conductors are then separated from the other components of the cable and weighed. Given a known density of the conductor material, it is therefore possible to determine the volume of the conductors. If this is divided by the known length of the sample piece, a value is obtained for the conductor cross section.

The resistance of a conductor, and therefore also the heat which is generated in it by a certain current are proportional to the cross section of this conductor. A large conductor cross section therefore reduces the heat which is produced. At the same time, the conductor materials are, however, dense and often have little flexibility. It is therefore advantageous for a charge cable to have a conductor cross section which is as small as possible but which of course is also sufficient to satisfy the requirements of the formation of heat. The same applies correspondingly to the single line of the charging cable.

In one preferred embodiment, the further conductors of the single line are arranged in such a way that they too can be penetrated by the cooling fluid. This embodiment has the advantage that the area which can output the heat produced in the conductor is very large. Furthermore, in this way a comparatively homogeneous distribution of temperature between all the involved conductors be easily obtained.

In one embodiment, the support structure is a helix or an open profile. The open profile has in particular a star cross section.

A helix in the mathematical sense is a curve which winds with a constant pitch around the lateral surface of a circular cylinder. The diameter of the base surface of the circular cylinder is the diameter of the helix. The thread pitch is the distance by which the helix winds around the cylinder in the direction of the longitudinal axis of the cylinder during one full revolution. The pitch of the helix is the ratio of the thread pitch to the circumference of the base surface, that is to say the thread pitch divided by $\pi$ times the diameter of the helix. The pitch angle is the arcus tangens of the pitch.

According to this application a helix is an object in which a material with an essentially constant cross section extends along the mathematical curve, for example a pin made of metal or plastic with a circular or rectangular cross section.

A helix is easy to manufacture and is lightweight, flexible and robust with respect to pressure perpendicular to the longitudinal axis. By selecting the thread pitch it is possible to adjust the size of the surface through which the cooling fluid comes into contact with the conductor braid, that is to say to how efficient the cooling is to be and how robust with respect to pressure the support structure is to be. It is possible that a helix has a plurality of thread pitches along its length. It is therefore possible for a single line to have, in areas which are particularly at risk of being driven over, a helix with a smaller thread pitch than in other areas. For the sake of simple manufacture, the thread pitch is preferably constant over the entire length.

The pitch of the helix is preferably between 0.1 and 0.3, particularly preferably the pitch is approximately 0.2.

A support structure in the form of an open profile can also be easily manufactured, for example by extrusion of a suitable plastic. While a helix has a comparatively large duct along its longitudinal axis, a plurality of relatively small ducts can be implemented with an open profile, or the cooling fluid can be forced to flow in a helical line. With an open profile it is possible to ensure better that the cooling fluid becomes mixed and does not flow a certain distance as it were without contact with the conductor arrangement and without absorbing any heat from the single line.

A star cross section is intended to constitute a shape which has a connecting surface and a plurality of fins projecting therefrom. The fins are connected to one another only via the connecting surface. In the case of a star cross section of the first type, the connecting surface is a circle and the fins are all of the same length. Furthermore, the fins are arranged at equal angular intervals from one another. In this case there are as many ducts as fins and all the ducts have the same cross section.

In the case of a star cross section of the second type, the connecting surface can be as desired and the fins can all have different lengths and be arranged at different angular intervals from one another. Again there are as many ducts as fins, but they can differ greatly from each another in terms of their cross section.

The connecting surface and the fins can have cavities. This provides a saving in weight.

In one embodiment, the support structure is a helix made of metal. The metal can in particular be copper or steel. The steel may be in particular be a chromium-nickel steel.

Most metals can be shaped to form a helix and conduct current and therefore can both perform the supporting function of the support structure and also conduct part of the current.

A steel wire can be comparatively easily introduced into the desired shape. A helix made of steel is flexible and stable. Furthermore, this support structure is comparatively resistant to heat so that a single line can be constructed which, in the event of the coolant failing, is not damaged, or is only damaged after a relatively long time. Chromium-nickel steel does not rust and can therefore be used in a water-cooled single line.

Copper conducts the current well. A helix made of copper can itself therefore conduct part of the current. It is therefore possible to achieve a certain saving in terms of material, making the cable lighter in weight. In addition to copper, copper alloys are also suitable.

Aluminum also conducts current well and can be shaped to form a helix.

The helix is preferably composed of the same material as the conductor braid.

In one embodiment, the conductors are wires. In particular, these wires have a round cross section. The conductors are preferably composed of copper. They are particularly preferably tin plated.

Wires are comparatively easy to manufacture, their properties are well known and instead of relatively large units such as for example, individual straps, the use of a large number of wires improves the fail safety. The breaking of a single wire can be compensated by all the others and therefore does not propagate.

The round cross section can also be easier to manufacture than other cross sections. After all, during the processing of the wires it is not necessary to pay attention to the alignment. The free spaces which are produced between the round wires permit the cooling fluid to penetrate there more easily and to flow.

Copper is a good and customary conductor, both for current and for heat, and is comparatively ductile. Silver has even better conductivity, but is less economical. Aluminum is also a good conductor, but less good than copper. On the other hand, aluminum is less dense than copper. With aluminum conductors the cable would therefore be lighter in weight.

The tin plating has the advantage that the wires are protected against corrosion. However, the tin plating can also be dispensed with, depending on the choice of the cooling fluid. This is the case in particular if the cooling fluid is provided with additives which form a protection against corrosion. Non-tin-plated wires may be more cost effective than tin-plated wires.

In one embodiment, the convex sheath of the support structure has a cross section with a shape which remains essentially the same along the longitudinal extent of the support structure. The contact points of the support structure with their convex sheath forms support structure lines in this embodiment. The angle at which at least some of the wires of the conductor braid intersect at least some support structure lines is between 45° and 135°, preferably between 60° and 120°.

The support structure lines constitute the areas where the conductor braid rests on the support structure when it is as close as possible to it. For the determination of the angles it is to be assumed that the conductor braid is as close as possible to the support structure. In the case of a cylinder-shaped conductor braid this means that it is stretched or compacted along its longitudinal axis until its internal radius corresponds to the circumscribing radius of the convex sheath of the support structure.

Penetration of the conductors of the conductor braid into the ducts which are formed using the support structure can occur in particular when a conductor runs almost parallel to its support surface. However, the conductors are held in position not only by the support structure but also by the other conductors of the conductor braid.

There is a risk of part of the conductor braid penetrating one of the ducts in particular when all of the conductors of the conductor braid intersect the support surfaces of the support structure at an obtuse angle. It is therefore preferred if at least some of the conductors intersect the support surfaces, that is to say the support structure lines, at an angle of more than 45°: therefore, they stabilize the entire conductor braid and make penetration of the support surfaces by the conductor braid improbable even in the case of movement and the exertion of pressure from the outside.

All the wires of the conductor braid particularly preferably intersect at least some support structure lines at an angle between 45° and 135°, particularly preferably at an angle between 60° and 120°.

In this embodiment, each wire of the conductor braid is as it were prevented from slipping into one of the ducts. Therefore, any loads are distributed on to all the wires of the conductor braid. The single line becomes even more robust.

In one embodiment, the conductor braid is composed of groups of wires which respectively run parallel to one another. These groups are braided together. Each of the groups comprises between three and eight wires, in particular six wires.

Such a conductor braid can be manufactured more easily in comparison with a braid of single wires. Furthermore, the groups prevent any of their constituent wires from bending during the braiding. Relatively large free spaces are produced between the braided groups, and the cooling fluid can flow through said spaces.

The longitudinal scale of the surface structure of the conductor braid can be influenced by the number of wires in a group.

In one embodiment, the support structure is an open profile whose cross section remains constant in shape and size along the longitudinal extent, but this shape rotates about a longitudinal axis along the longitudinal extent.

Such a profile is also referred to below as twisted. As result of the rotation helix-shaped ducts are produced. A cooling fluid which flows through these ducts is therefore made to eddy. The distance is shorter near to the longitudinal axis than on the outside. There are therefore different speeds of fluid in the duct and this results in a greater degree of mixing of the cooling fluid. The entire volume of the cooling fluid can therefore be used better.

A charging cable according to the invention comprises a first and a second single line according to the invention and a common protective sleeve.

The common protective sleeve holds the two single lines together and protects them against abrasion and environmental influences such as ultraviolet radiation, fuel residues, shards and the like. The protective sleeve can be embodied with multiple layers and at the same time contain single layers of different colors so that critical abrasion can be easily detected. The protective sleeve can have thin test lines extending through it, which lines can be used to detect excessive heat and/or damage to the cable, for example as result of a rise in the electrical resistance in these test lines. The protective sleeve can be reinforced at certain points or overall or can be provided with structures or coatings to provide better grip. The protective sleeve can also be a thermal insulator in order, for example, to prevent the cooling fluid from freezing at low external temperatures, in particular if water is used, and in particular also to conduct away, primarily via the cooling fluid, the heat which is produced during use, and to prevent excessive heating of the outside of the protective sleeve.

In one embodiment, the common protective sleeve covers the single lines only in certain sections, for example at regular intervals and/or wherever there is a risk of particular loads. The common protective sleeve preferably covers the first and second single lines according to the invention essentially over their entire length.

The first and second single lines according to the invention are preferably of identical design and differ, if at all, only in respect of the coloring of their insulation. In another embodiment, the first and second single lines according to the invention differ in respect of their support structure, in respect of the configuration of the conductor arrangement and/or in respect of their dimensions.

In one embodiment, the charging cable also comprises a neutral conductor braid which surrounds the first and second single lines and is covered by a common protective sleeve or is integrated therein.

This neutral conductor braid, for which there are the same configuration possibilities as for the conductor braid of the single lines, can serve as a neutral conductor and/or screen, depending on the mode of operation of the charging cable. Furthermore, it may serve to detect damage to the cable or overheating.

If the neutral conductor braid is integrated into the protective sleeve, material of the protective sleeve is located underneath and above the neutral conductor braid. The neutral conductor braid is therefore protected and can be used to detect damage to the cable or a high sleeve temperature.

If the neutral conductor braid is, on the other hand, located inside the cavity which is defined by the protective sleeve, but outside the protective sleeve itself, it is more flexible.

The neutral conductor braid can also be attached to the inside of the protective sleeve.

In one embodiment, a charging cable has at least one hose, preferably two, three or four hoses, composed of a fluid-tight material. The hoses are located inside the common protective sleeve, but outside the first or second single line.

The hoses serve to transport cooling fluid outside the single lines.

Inter alia polyurethane (PUR), EPDM, nylon, polyamides and silicones are suitable as the material for hoses. The material should be suitable for the cooling fluid which is used, be flexible and be able to withstand a high internal pressure.

In a first embodiment, the cooling fluid is pumped through the single lines and exits at the end of the cable and is disposed of. This procedure is suitably carried out, for example, with air as the cooling fluid.

In another embodiment, the cooling fluid is transported through the first single line and back through the second single line.

In a further embodiment, the cooling fluid is transported through both single lines and back through one hose or two hoses.

In a further embodiment, the cable additionally comprises two hoses which constitute the forward line and return line for a plug cooling system.

In a further embodiment, the cable comprises two hoses, one of which constitutes the forward line to a plug cooling system and the other comprises the return line for cooling fluid from the plug cooling system and from the two single lines.

The forward line is to be understood here as being a duct or a hose which leads away from a pump or a location with a high fluid pressure. A return line is to be understood here as being a duct or a hose which leads to a pump or to a location with low fluid pressure. The assignment as to what belongs to the forward line and what to the return line preferably changes halfway along the path of the cooling fluid from the outlet of the pump back to its inlet, or halfway along from the location of the high fluid pressure to the location of the relatively low fluid pressure. The high fluid pressure is here a pressure which is higher than the low fluid pressure.

The hoses can have different diameters. The diameter of the hoses is selected as a function of the spatial conditions and the desired speed of the fluid at the desired through-flow rate.

The hose or the hoses can have a round or a non-round cross section. Hoses with a round cross section are simpler to manufacture and a large variety of them can be obtained. On the other hand, hoses with a non-round cross section can make optimum use of the spatial conditions in the charging cable.

In one embodiment, the single lines are located in a hose. In this embodiment the common protective sleeve can constitute the hose.

A hose according to this invention is provided for transporting cooling fluid. Therefore, its ends can be connected in a particularly fluid-tight fashion and it is composed of fluid-tight material. The interior of the hose is preferably free, apart from the cooling fluid.

In one embodiment, the charging cable comprises a neutral conductor, preferably made of twisted wires and directly covered by an electrically insulating neutral conductor insulation element. The neutral conductor is arranged within the common protective sleeve.

Such a neutral conductor can be a customary power cable. A charging cable which integrates the neutral conductor in this way is particularly easy to manufacture and cost-effective.

The neutral conductor is preferably located outside the single lines. The neutral conductor is preferably located outside a hose.

In one embodiment, a charging cable comprises one or more signal cables which are preferably arranged in a common sheath. The signal cables are preferably arranged in the common sheath within the common protective sleeve. Each signal cable has a signal conductor and a protective layer. The protective layer surrounds the signal conductor. The signal conductor in at least one of the signal cables is composed of conductors in the form of wires. The conductor cross section of the signal conductor is less than $1/20$, preferably less than $1/40$ of the conductor cross section of the first single line. The protective layer is electrically insulating.

There are typically a plurality of signal cables. The combination in a common sheath simplifies the design and the connection of the charging cable, since all the signal cables are located spatially closely next to one another. In addition to signal conductors composed of conductors, signal conductors composed of glass fibers can be used.

Signal conductors composed of conductors are intended to transmit significantly less power than the single lines. Their conductor cross section is therefore significantly smaller.

In one embodiment, a charging cable comprises one or more of the following components: neutral conductor, covered signal cables, hose, filler.

Each of these components has an essentially circular cross section, and this cross section has a circumscribing radius.

The first and second single lines each have a round cross section, and the cross sections of the first and second single lines have the same circumscribing radius R.

The circumscribing radius of each of the components which occur is less than or equal to $2/3$ of the circumscribing radius R of the first single line.

The circumscribing radius of the components which occur is in particular essentially equal to $1/3$ or $2/3$ of the circumscribing radius R of the first single line. There are in particular not more than two components with a circumscribing radius of $2/3$ of the circumscribing radius R of the first single line and not more than four components with a circumscribing radius of $1/3$ of the circumscribing radius R of the first single line in a charging cable.

The filler is composed of fibers or strips which are twisted or run in parallel, and it has the function of maintaining the shape of the cable, and is essentially filler material. The filler can also be used to absorb mechanical traction forces acting on the cable. It therefore also serves inter alia to provide roll-over resistance. The filler is composed in particular of a favorable thermoplastic material which does not have any halogens. Examples of such materials are polypropylenes and polyethylenes.

According to this embodiment, the single lines determine the circumference of the charging cable, wherein the charging cable which is present has a round cross section. All the other components share the space which is produced within the circumference around the two single lines. This embodiment has the advantage that the comparatively stable single lines protect the entire cable against pressure loading in at least one direction. As result of the optimum utilization of space the circumference of the cable is kept as small as possible, which makes it easier to handle.

A first charging system according to the invention comprises a charging cable according to the invention, an end connection and a plug. The end connection comprises a fluid feed line which feeds fluid into at least the duct of the first single line and receives fluid from the duct of the second single line and/or from at least one hose. The plug comprises a fluid return line which receives the fluid from at least the duct of the first single line and conducts it to the duct of the second single line and/or to the at least one hose.

In one embodiment, the end connection comprises a fluid feed line which introduces fluid into the duct of the first single line and receives fluid from the duct of the second single line. The plug comprises a fluid return line which receives the fluid from the duct of the first single line and conducts it to the duct of the second single line.

The end connection can be an adapter part for the connection to a charging station with an integrated pump and power supply or can be this charging station itself. Power can also be supplied outside the end connection, since in the simplest case the end connection constitutes a pump or a connection to a line. A cooling device or a preparation device, which cools and/or prepares the cooling fluid, can be connected in the end connection or upstream thereof. Preparation can mean that the cooling fluid is filtered or provided with additives. The charging cable can be attached to a geographic location through the installation on the end connection.

By virtue of the cooling of the cooling fluid, the temperature of the conductor arrangement of the single lines can also be lowered further or cooled to a greater extent. In this way, it is also possible to transmit more power with the cable than in the case of cooling with a cooling fluid with an ambient temperature. The cable can therefore be used over a wide range of transmission currents, wherein a coolant cooling system which is connected upstream simply has to be adapted to the conditions which are respectively required. In the most favorable case, when the desired charging current is increased it is simply necessary to adapt the control of a charging system without the need to exchange devices or charging cables.

A cooling system also makes it possible for the cooling fluid which emerges from the charging cable to be quickly brought back to its initial temperature, so that it can be introduced into the charging cable again. The required volume of the cooling fluid in a closed cooling fluid circuit is significantly lower with a cooling system than when waiting until the absorbed heat is output into the surroundings again without further help. The outputting of heat to the surroundings can be promoted by a suitable shape of a cooling fluid tank if this is desired.

The plug is mounted at the other end of the charging cable. The plug permits an electrical connection, which can be produced without a tool, to be made to the energy store which is to be charged. The cooling fluid circuit preferably enters the plug, and leaves it again, only through the charging cable.

The cooling fluid system comprising an end connection, charging cable and plug can therefore be tested for its density without an energy store having to be connected.

The energy store is preferably the drive battery of a vehicle. However, it is also possible to charge accumulators or batteries which are used in different ways with the charging cable and/or the charging system. Other energy stores, for example flywheels or capacitors, can also be charged with the charging cable and/or the charging system.

If the cooling fluid in the first single line is conducted from the end connection to the plug and in the second single line from the plug to the end connection, the charging cable can be made particularly compact.

In one embodiment, the end connection comprises a fluid feed line which feeds fluid into the ducts of the first and second single lines and receives fluid from at least one hose of the charging cable, and the plug comprises a fluid return line which receives fluid from the ducts of the first and second single lines and conducts it to the at least one hose.

This embodiment has the advantage that cooling fluid at the same temperature flows through both single lines, so that the lines are subjected to the same loading.

Whether one or more hoses are used to transport the cooling fluid from the plug to the end connection can be selected depending on the design of the cable. The use of a hose to return the cooling fluid from both single lines is preferred, since in this way on the one hand the expenditure on installation is reduced and on the other hand the flow resistance is lower.

In one embodiment, a charging system comprises a charging cable with at least two hoses for supplying a plug cooling system and a plug with a plug cooling system. The plug cooling system comprises at least one cooling line. Cooling fluid can be introduced into the cooling line from one of the at least two hoses for supplying the plug cooling system. The cooling fluid can flow off again through another of the at least two hoses.

A large amount of heat is produced particularly where the electrical resistance is high. This is often the case at contact faces and at connecting points, that is to say particularly in the region of the plug. Parts of the plug should, however, also continue to be able to be touched by the user and should therefore have a surface temperature of less than 40° C. Other parts, in particular connecting points of the conductors, can fail as a result of excessively high temperatures. In order to prevent this, the use of a plug cooling system is appropriate. Said system can either use the cooling fluid from the single lines or else have its own cooling fluid supply lines. The use of the cooling fluid from the single lines in the plug cooling system permits a compact design of the cable, since no further hoses are required. However, if primarily the surface temperature is to be lowered with the plug cooling system, so that the user can touch the plug, it is more efficient to supply the plug cooling system by means of two hoses: the same setpoint value preferably applies to the surface temperature of the charging cable and plug. The through-flow rate of the cooling fluid can then be selected to be just such that this setpoint value is reached at the end of the cable. In general, with a cooling fluid which is heated in such a way it is then, however, not possible also to lower the plug to the setpoint value. Instead, in the variant without hoses for supplying the plug cooling system, the cables would have to be cooled to a greater extent than desired in order to keep the plug at the setpoint temperature. This greater degree of cooling signifies a higher through-flow rate and therefore higher fluid speeds and/or wider ducts. Relatively high fluid speeds and therefore relatively high pressures make the charging cable less flexible; relatively wide ducts make the charging cable less easy to handle. Ultimately, it is possible to calculate, for a setpoint current, a desired maximum surface temperature, a length of the cable and a given plug design, whether in a specific case a more compact charging cable with sufficient flexibility is obtained by cooling the plug using the cooling fluid from the single lines or using supply hoses.

A method according to the invention for charging an energy store, in particular a battery of a vehicle, at a stationary charging station which can make available cooling fluid and electrical energy, and to which a first end of a charging cable according to the invention is connected, comprises the following steps:

Connecting a second end of the charging cable to the energy store, in particular to the battery of the vehicle.

Introducing a cooling fluid under pressure, in particular pumping the cooling fluid into the ducts of the single lines of the charging cable.

Transmitting electrical energy via the conductor braid and, if appropriate, the conductors of the single lines of the charging cable.

In this context, in particular signal cables of the charging cable are used to transmit signals for controlling and/or monitoring the charging process and/or the state of charge of the energy store, in particular of the battery.

In one embodiment, the method also comprises cooling the cooling fluid before it is introduced into the ducts of the single lines of the charging cable.

By using cooled cooling fluid it is also possible to transmit even higher currents with the charging cable, and the charging method becomes independent of the temperature at which the cooling fluid is made available.

The energy store of the vehicle is in particular a battery for driving the vehicle. The connection of the charging cable to the battery of the vehicle is preferably carried out by means of a plug which is mounted on the charging cable and a socket which is mounted on the vehicle and which is connected to the battery. The plug can be plugged into the socket when connection occurs.

The introduction of the cooling fluid under pressure is preferably carried out by means of a pump which is mounted locally on or in the charging station. However, it is also possible for the charging station to be connected to a tank or a line which makes available cooling fluid at a specific pressure. For example, water as the cooling fluid can be supplied with a water tower, wherein the water is pumped into a reservoir at a higher altitude in a way which is separate from the charging station and the charging process both in terms of time and space.

The signal cables can bring about communication between the vehicle and charging station.

Therefore, for example when fault messages occur, the charging station can interrupt the flow of current and check the correct connection of the charging cable to the battery of the vehicle before the start of charging. The signal cables can, however, also serve to monitor the charging cable itself by conducting sensor signals from sensors in the plug or from sensors in the cable to the charging station. If a sensor detects, for example, a temperature above a specific threshold, the charging station can increase the flow of cooling fluid or interrupt the charging process.

Ambient air, water, oil, in particular transformer oil, or ester fluid can be used as the cooling fluid. Water is preferably provided with additives in order to protect against corrosion, to lower the freezing point or to increase the thermal capacity.

A preferred cooling fluid is a mixture of distilled water with propylene glycol and, if appropriate, further additives for protecting against corrosion and for electrical insulation. This mixture has a high thermal capacity and low viscosity.

Water has the advantage that it has a high thermal capacity, is non-poisonous and is very readily obtainable. Additives can lower its freezing point and influence some of its other properties. The water can therefore also be mixed with an anti-corrosion agent or its thermal capacity can be increased by means of additives.

Transformer oil and ester fluids, such as saturated pentaerythritol tetra fatty acid esters are known from the application in transformers where they are also used to cool electronic components.

Ambient air has the advantage that it is always available and does not require a storage device.

In addition to the cooling fluid, the cooling performance can also be influenced by a through-flow rate.

In one preferred embodiment, the single line is part of the vehicle and connects in particular a connecting plug, in particular a first part of a connecting plug, on the outside of the vehicle to a drive battery of the vehicle. The first part of the connecting plug is in particular a part of a socket which is mounted on the vehicle and is connected to the battery.

In one preferred embodiment, the single line is part of a stationary charging pillar and connects a connecting plug from in particular a second part of a connecting plug, to a stationary power source. The second part of the connecting plug is preferably a part of a plug which is mounted on the charging cable.

In one particularly preferred embodiment, the first and the second parts of the connecting plug are embodied in such a way that the conductor arrangement, in particular the conductor braid, of a single line which is part of the vehicle is electrically connected to the conductor arrangement, in particular the conductor braid of a single line which is part of the stationary charging pillar, and cooling fluid can flow out of the duct of the single line which is part of the vehicle into the duct of the single line which is part of the stationary charging pillar, and vice versa. In one embodiment, such a connecting plug comprises a hollow-cylinder-shaped contact on each of its first and second parts. The conductor arrangement, preferably the conductor braid, of a respective single line, is preferably attached to one end of each of these contacts. The external diameter of the one contact, specifically of the outer contact, corresponds essentially to the internal diameter of the other contact, specifically of the inner contact, so that the two contacts can be pushed one into the other at least over a certain distance, and at the same time an electrically conductive connection is produced. The inner contact preferably has an area with a relatively large external diameter, forming a stop, at its end facing the single line. A cooling fluid seal can be provided at this stop.

In a further embodiment, the first part of the connecting plug comprises a first cooling fluid duct which can receive cooling fluid from the single line which is connected to the first part of the connecting plug. In this embodiment, the second part of the connecting plug comprises a second cooling fluid duct which can receive cooling fluid from the single line which is connected to the second part of the connecting plug. In this embodiment, the first cooling fluid duct is connected to the second cooling fluid duct so that the cooling fluid from the single line which is connected to the first part of the connecting plug can flow through the first cooling fluid duct of the first part of the connecting plug into the second cooling fluid duct of the second part of the connecting plug into the single line which is connected to the second part of the connecting plug. Since the first and second cooling fluid ducts can be routed within the connecting plug independently of the flow of current, this embodiment has the advantage that regions of the first and/or second parts of the connecting plug can be selectively cooled or temperature-controlled. Therefore, for example a gripping device can be cooled to a greater extent than other regions.

In a further embodiment, the first part of the connecting plug comprises a first cooling fluid duct which can receive cooling fluid from the single line which is connected to the first part of the connecting plug. In this embodiment, the second part of the connecting plug comprises a second cooling fluid duct which can receive cooling fluid from the single line which is connected to the second part of the connecting plug. In this embodiment, the first and the second cooling fluid ducts are always separated from one another. The first cooling fluid duct can be connected, for example, to a hose or it can conduct the cooling fluid into the surroundings of the connecting plug, or it can conduct the cooling fluid into a second, first part of a further connecting plug with a further, connected single line. Analogously, the second cooling fluid duct can be connected to a hose, and the second cooling fluid duct can conduct the cooling fluid into the surroundings of the connecting plug or the cooling fluid into a second, second part of a further connecting plug with a further connected single line.

In one preferred embodiment, there is a set of two single lines and a connecting plug, wherein the two single lines can be connected to one another in such a way that they can be detached and reconnected using the connecting plug. In this context, one single line is connected to the first part of the connecting plug and the other single line is connected to the second part of the connecting plug.

In one preferred embodiment, the charging cable is part of the vehicle and connects in particular a first part of a cable connecting plug on the outside of the vehicle to a drive battery of the vehicle.

In one preferred embodiment, the charging cable is part of a stationary charging pillar and connects a second part of a cable connecting plug to a stationary power source.

In one particularly preferred embodiment, the first and second parts of the cable connecting plug are embodied in such a way that the single lines are connected to one another in such a way that power and cooling fluid from a respective single line of the charging cable, which is part of the stationary charging pillar, can flow into a single line of the charging cable which is part of the vehicle. In one embodiment, such a cable connecting plug comprises, at its first part, at least two first parts of a connecting plug, and at its second part at least two second parts of a connecting plug. In addition, the cable connecting plug preferably comprises further connections which connect hoses and/or signal cables to one another.

In one preferred embodiment, there is a set of two charging cables and a cable connecting plug, wherein the two charging cables can be connected to one another in such a way that they can be detached and reconnected using the cable connecting plug.

In one embodiment, a charging connecting plug comprises two connecting plugs which each comprise a first and a second cooling fluid duct. The second part of this cable connecting plug is configured in such a way that the second cooling fluid ducts of the second parts of the two connecting plugs are connected to one another, and there is therefore a fluid return line. The second part of this cable connecting plug is therefore in particular a plug of a charging system. The first part of this cable connecting plug is configured in such a way that the first cooling fluid ducts of the first parts of the two connecting plugs are each connected to a hose through which cooling fluid can be fed in or discharged so that the first cooling fluid ducts of the first part of this cable connecting plug are in particular a fluid feed line. The first part of this cable connecting plug therefore constitutes in particular an end connection of a charging system. At the same time, the first part of this cable connecting plug also in particular constitutes a socket which is mounted on the vehicle and which is connected to the battery of the vehicle by means of the charging cable which is connected to it.

Further advantageous embodiments and combinations of features of the invention become apparent from the following detailed description and the entirety of the patent claims.

BRIEF DESCRIPTION OF THE DRAWINGS

In the drawings which are used to explain the exemplary embodiment.

Basically, identical parts are provided with the same reference symbols in the figures.

WAYS OF IMPLEMENTING THE INVENTION

Figure 1A:
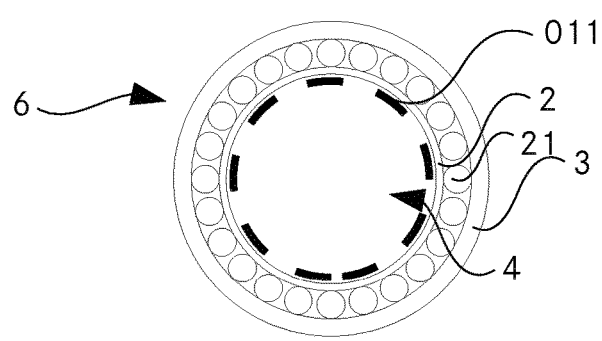
FIG. 1a shows a round single line with a helix as a support structure and twisted conductors on the conductor braid.

FIG. 1a shows a cross section through a round single line 6 with a helix 011 as a support structure and twisted conductors 21 on the conductor braid 2 which directly covers the helix 011. The twisted conductors 21 are located on the conductor braid 2. The conductor braid 2 and twisted conductors 21 are in electrical contact with one another and together conduct the current which flows through the single line 6. The twisted conductors 21 are covered directly by an insulation element 3. In the interior of the helix 011 there is the duct 4 which is bounded by the helix 011 and the conductor braid 2. This boundary is, however, not tight with respect to cooling fluid so that the cooling fluid 5 can propagate in the radial direction as far as the insulation element 3.

Figure 1B:
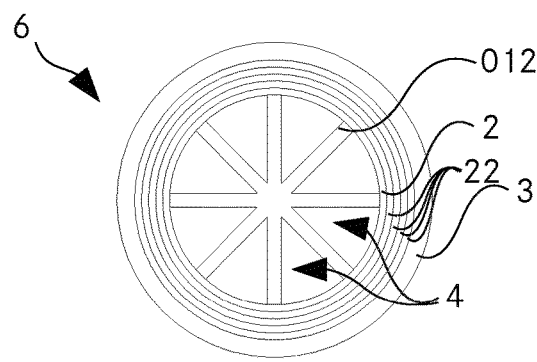
FIG. 1b shows a round single line with an open profile as a support structure and a plurality of conductor braids.

FIG. 1b shows a cross section through a round single line 6 with an open profile 012 as a support structure and a plurality of layers of conductors 22 which are arranged as a braid and on the conductor braid 2. The conductors 22, which are arranged as a braid, and the conductor braid 2 are in electrical contact with one another and together conduct the current which flows through the single line 6. The conductors 22, which are arranged as a braid, are covered directly by an insulation element 3. The support structure has a cross section in the shape of a star with a round connecting surface and six fins which are arranged uniformly around the connecting surface. This therefore constitutes a star cross section of a first type. There are in total six ducts 4 which are of equal size and are bounded by the open profile 012 and the conductor braid 2, wherein in this case the conductor braid 2 is also to be permeable to the cooling fluid 5. The cooling fluid 5 can therefore propagate as far as the insulation element 3.

Figure 1C:
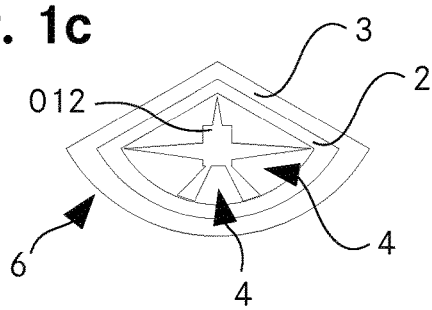
FIG. 1c shows a sector-shaped single line with an open profile as a support structure.

FIG. 1c shows a cross section through a single line 6. This single line 6 is in the shape of a circular sector. An open profile 012 as a support structure is located in the center. This connecting surface is a rectangle in this case. There are five fins, some of which have a triangular cross section and some a lozenge-shaped one. The fins are of different lengths. The arrangement is mirror-symmetrical around the axis of symmetry of the circular sector. This therefore constitutes a star cross section of a second type. The open profile 012 is directly surrounded by the conductor braid 2 and this is in turn surrounded by the insulation element 3. The entire current which this single line 6 conducts flows through the conductor braid 2.

Figure 2:
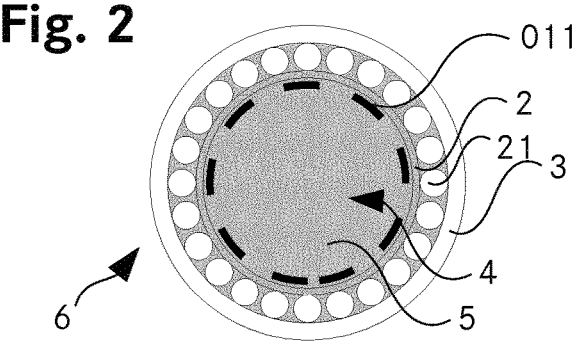
FIG. 2 shows distribution of the cooling fluid in the round single line from FIG. 1a, FIG. 3a shows an open profile.

FIG. 2 shows the distribution of the cooling fluid 5 in the single line of FIG. 1a. The cooling fluid 5 is represented in grey. Starting from the duct 4, it is distributed through the conductor braid 2, between the conductors 21 as far the insulation element 3. The insulation element 3 is fluid-tight. The conductor braid 2 is composed of a large number of conductors and leaves free spaces between at least some of these conductors. The conductors 21, 22 themselves are generally impermeable to fluid, but the fluid is distributed in the free spaces. Finally, the distribution shown is achieved in which essentially a large part of the surface of all the conductors 21, 22 is in contact with the fluid.

Figure 3A:
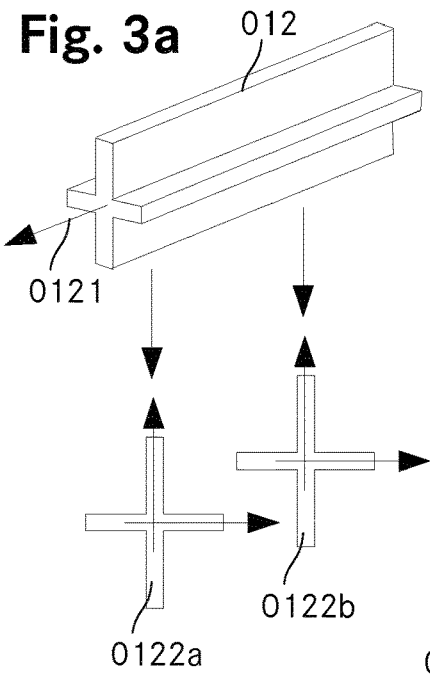
FIG. 3b shows a twisted open profile.
FIG. 3c shows a helix with a variable thread pitch.

FIG. 3a shows an open profile 012 with a star cross section of a second type with a round connecting surface and four fins which are distributed at equal angular intervals but have different lengths. The open profile 012 has a longitudinal axis 0121. Cross sections along this longitudinal axis 0122a, b, c are always the same and are in the shape of an upright cross, wherein the horizontal extent is always smaller than the vertical one.

Figure 3B:
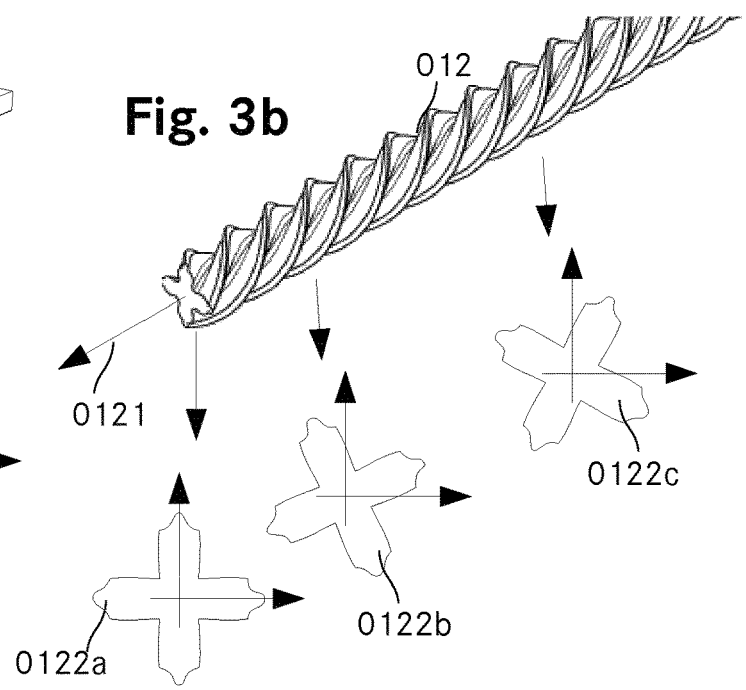

FIG. 3b shows an open profile 012 with a star cross section of a first type with a round connecting surface and four fins which are distributed at equal angular intervals and have the same lengths. The open profile 012 has a longitudinal axis 0121. Cross sections along this longitudinal axis 0122a, b, c are always the same in terms of their shape but are rotated with respect to one another. The shape of the cross sections is a cross with approximately triangular fins, wherein the height of the triangles is the same. This is an example of a twisted open profile.

Figure 3C:
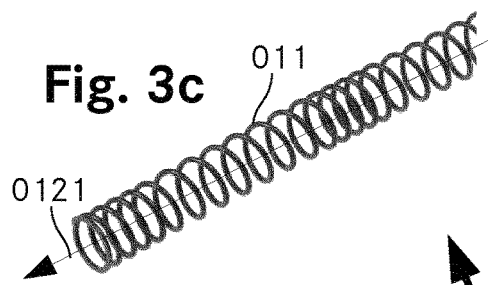

FIG. 3c shows a helix 011 with sections with a different thread pitch 0111. This helix 011 is fabricated from round wire. The helix 011 also has a longitudinal axis 0121.

Figure 4A:
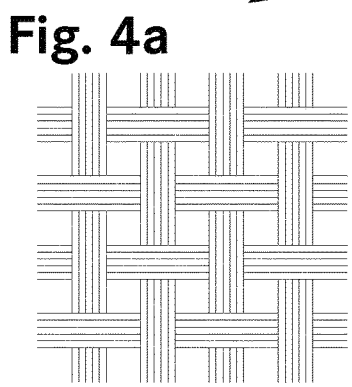
FIG. 4a shows a fabric with groups of conductors running in parallel.

FIG. 4a shows an example of a fabric, which according to this application is to be considered as constituting a special case of a braid. Groups of in each case five conductors extend parallel to one another and are woven together. There are horizontally and vertically extending groups. The horizontally and vertically extending groups intersect at an angle of 90°. A group always passes alternately above and below through the groups extending at 90° with respect to it.

Figure 4B:
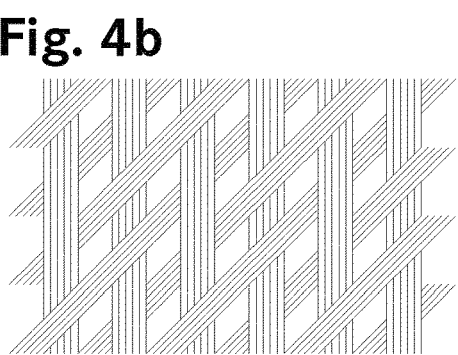
FIG. 4b shows a braid with groups of conductors running in parallel.

FIG. 4b shows an example of a braid. Groups of five conductors in each case also extend parallel to one another here and are braided together. There are vertically and obliquely extending groups. The vertically extending groups and the obliquely extending groups intersect at an angle which is unequal to 90°, an angle of 45° in the case in FIG. 4b. Each of the obliquely extending groups intersect in each case two vertically extending groups above and subsequently two vertically extending groups below. Each of the vertically extending groups intersect in each case two obliquely extending groups above and subsequently two obliquely extending groups below.

"Intersect above" and "intersect below" are intended to mean in this context that the intersecting group lies above or below the group with which there is intersection, in the region of the intersection point. "Intersect" is intended to be equivalent here to "cross".

Figure 5:
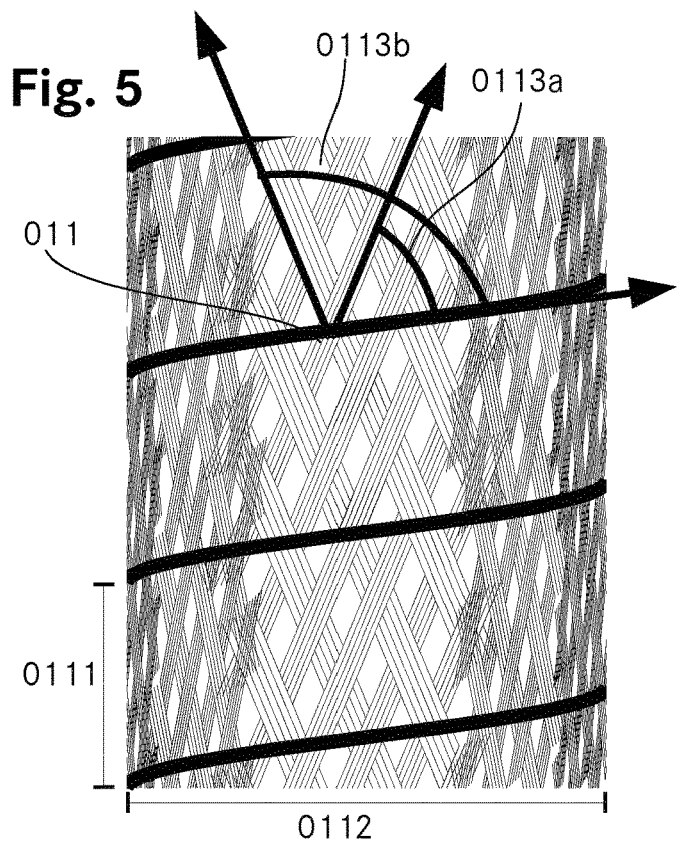
FIG. 5 shows a helix as a support structure with a conductor braid resting on it.

FIG. 5 shows a helix 011 with a constant thread pitch 0111 in a side view. In addition, the conductor braid 2 which directly covers the helix 011 is shown. The thread pitch 0111 can be easily recognized in this view by virtue of the fact that, for example, the distance between the two points at which the helix 011 appears in the field of vision is considered. The thread pitch 0111 is a length unit here. The diameter 0112 of the cylinder which is defined by the helix 011 in this view also appears to be equal to the width of the rectangle, which is how the cylinder appears in this view. The diameter 0112 is equal to 2.3 length units here.

The convex sheath of the Helix 011 is the cylinder which is shown in the side view. The contact point of the support structure, that is to say of the helix 011, with this circular cylinder, that is to say its convex sheath, are in fact points of the helix 011 which are furthest away from the longitudinal axis 0121 of the helix 011. The support structure lines are therefore equal in the present case since the extent of the wire which defines the helix 011 is not illustrated, only the lines with which the helix 011 is shown in FIG. 5.

The conductor braid 2 is composed in the present case of wires which can be divided into two classes. All the wires of one class lie parallel to one another. There are therefore only two angles 0113a, b between the support structure lines and the wires of the braid.

The wires of the braid extend on helical lines and each have a thread pitch 0111 of 11.1 length units. The pitch angle is arctan(thread pitch/($\pi$ diameter))=arctan(11.1/(2.3 $\pi$))=57°, wherein the winding is left-handed sometimes and right-handed sometimes.

The helix 011 of the support structure is right-handed and has a thread pitch 0111 of 1 and therefore a pitch angle of arctan(1/(2.3*$\pi$))=8°.

In the example shown, the wires in the conductor braid 2 therefore cross the support structure lines at an angle 0113 of 57°−8°=49° and of)(180°−57°−8°=115°.

In the example shown there are therefore some wires in the conductor braid 2 which cross the support structure lines at an angle 0113 between 60° and 120°, and all the wires in the conductor braids 2 cross the support structure at an angle 0113 between 45° and 135°.

In order to determine the angle 0113 at which at least some of the wires of the conductor braid 2 cross at least some of the support structure lines, the unwound situation is therefore to be considered. Furthermore, the conductor braid 2 is to be stretched for the determination such that it is actually in contact with the support structure.

Figure 6A:
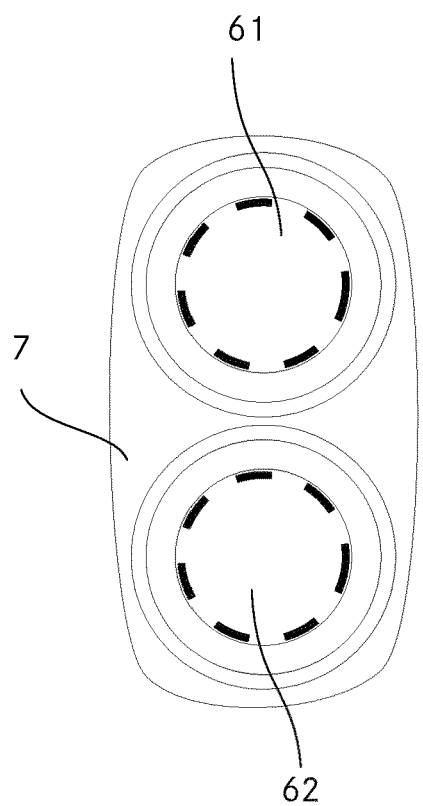
FIG. 6a shows a charging cable with two single lines.

FIG. 6a shows a charging cable 12 with two single lines 61 and 62. The first and second single lines 61 and 62 have a helix 011 as a support structure and both have a round cross section and the same diameter. The single lines 61 and 62 are illustrated only schematically. Whether there is only the conductor braid 2 here or the conductor braid 2 and twisted conductors 21 or further conductors 22 which are arranged as braids is left open here. All variants are possible and the first single line 61 can be constructed differently than the second single line 62. The single lines 61 and 62 could also differ in their diameter and/or their shape. The two single lines 61 and 62 lie one next to the other and within a common protective sleeve 7. The protective sleeve 7 has here the cross section of a rectangle with rounded corners and somewhat recessed sides. In this case, the protective sleeve 7 fills the entire space between its surface and the single lines 61 and 62.

Figure 6B:
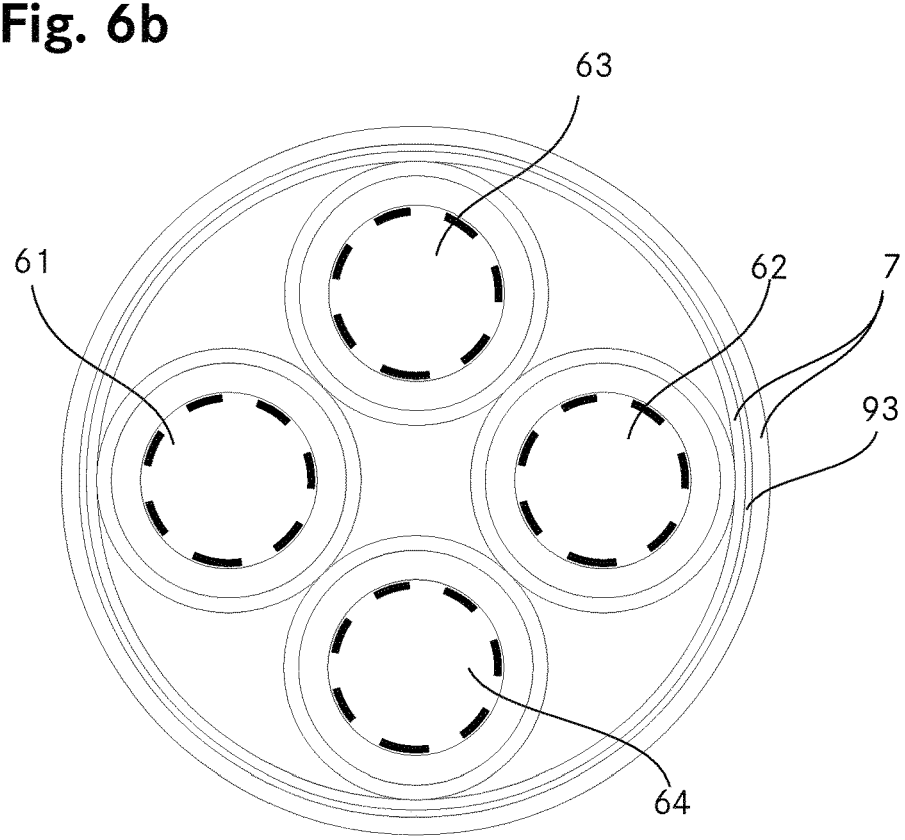
FIG. 6b shows a charging cable with four single lines.

FIG. 6b shows a further charging cable 12. The latter comprises four single lines 61, 62, 63 and 64. The four single lines 61, 62, 63 and 64 have the same diameter and are arranged at the vertices of a square which has a side length of a diameter of a single line 6. The four single lines 61, 62, 63 and 64 are surrounded by a protective sleeve 7. The protective sleeve 7 is in the shape of a hollow circular cylinder with an internal diameter which is precisely (1+√

(2)) times the diameter of a single line 6. A neutral conductor braid 93 is located within the protective sleeve 7 that is to say in the region between its inner radius and outer radius. This neutral conductor braid 93 is a conductor braid and can be configured in the same way and from the same materials as the conductor braid 2 of the single line 6. It can serve both as a neutral conductor 9 and as a screen or as a sensor for defects or excessively high temperatures in the protective sleeve 7.

Figure 6C:
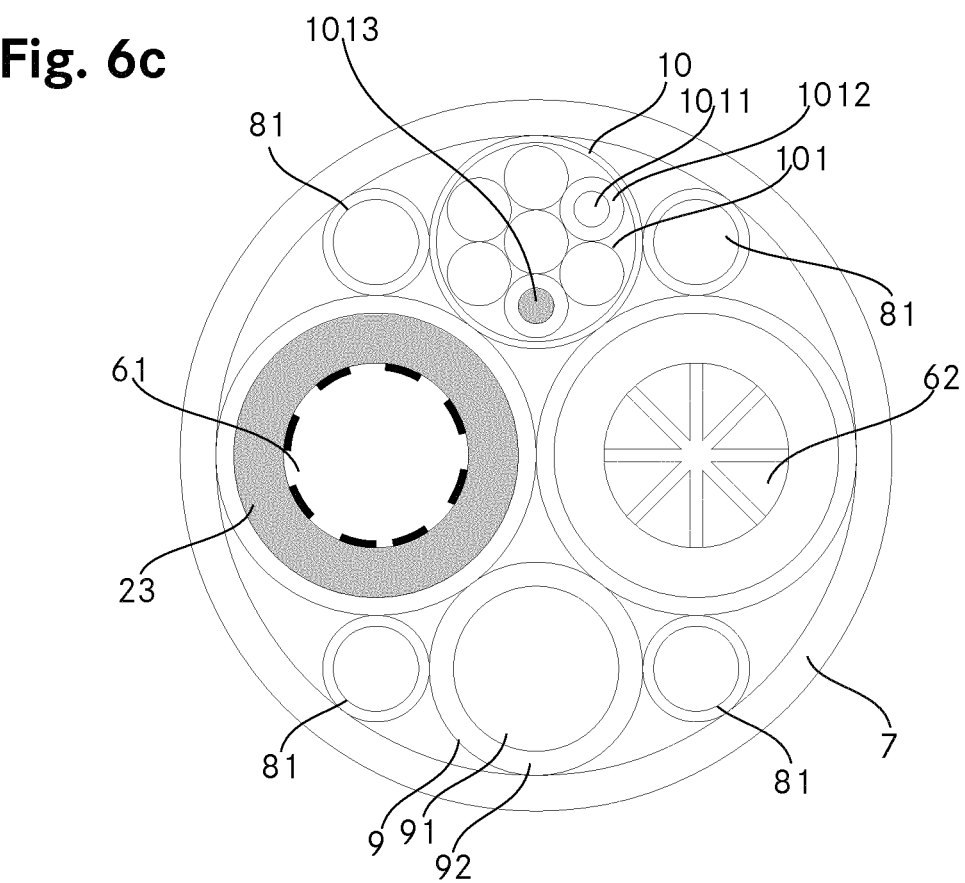
FIG. 6c shows a charging cable with two single lines, a neutral conductor, hoses and signal cables.

FIG. 6c shows a further charging cable 12. The latter comprises a first and a second single line 61, 62, a neutral conductor 9, seven signal cables 101 in a common sheath 10 and four hoses 81. All this is surrounded by a common protective sleeve 7. The protective sleeve 7 is in the shape of a round hollow cylinder with an internal diameter which corresponds to twice the diameter of a single line. The first and second single lines 61, 62 both have a round cross section and the same diameter. They differ in the support structure: the first single line 61 uses a helix 011, while the second single line 62 uses an open profile 012.

The neutral conductor 9 also has a round cross section. It is composed of neutral conductor wires 91 and a neutral conductor insulation element 92. The diameter of the neutral conductor 9 is ⅔ the diameter of the first single line 61.

The sheath 10 of the covered signal cables 101 also has a diameter of approximately ⅔ of the first single line 61. In cross section, the sheath 10 of the covered signal cables 101 is circular. Each individual signal cable 101 also has a round cross section. The sheath 10 is thin. Two of the depicted signal cables 101 is composed of a signal conductor 1011 which is surrounded directly by a protective layer 1012. The signal conductor 1011 has a signal conductor cross section 1013.

The conductor cross section 23 of the first single line 61 is also shown. It comprises both the conductor cross section of the conductor braid 2 of the single line 61 and the conductor cross section of possible further conductors which are in electrical contact with the conductor braid 2.

The conductor cross section 23 of the first single line 61 is more than 20 times as large as the signal conductor cross section 1013.

Each of the four hoses 81 has a round cross section and an external diameter of approximately ⅓ of the diameter of the first single line 61.

The first and second single lines 61, 62 are arranged one next to the other and are in contact. The sheath 10 with the signal cables 101 which are covered by it are arranged above the contact point and in contact with the two single lines 61, 62. The neutral conductor 9 is arranged underneath the contact point and in contact with the two single lines 61, 62. The two hoses 81, which return the cooling fluid 5 of the single lines 61, 62, are each arranged in such a way that they are in contact with one of the single lines 61 or 62 and the neutral conductor 9. The two hoses 81, which supply the plug cooling system 146, are each arranged in such a way that they are in contact with one of the single lines 61 or 62 and the sheath 10. This results in tight packaging of all the components of the charging cable 12 and of the two single lines 61, 62. In addition, in this arrangement there are eight points which lie on the circumference of the arrangement. The inside of the protective sleeve 7 corresponds precisely to the circumference of the arrangement. Four of the eight points lie precisely 90° away from one another and are formed by solid conductors, the single lines 61, 62, the neutral conductor 9 and the signal cables 101 in their sheath 10. The potentially compressible hoses 81 lie between these virtually incompressible structures. When there is a high pressure the hoses 81 can then be deformed but they are protected against complete closure by the virtually incompressible structures on both sides.

In one preferred embodiment, the support structure of both single lines 61, 62 is a helix 011 composed of wire made of chromium-nickel steel with a wire diameter of 0.6 mm. The latter is surrounded by a plurality of layers of conductor braid 2 composed of tin-plated copper wires, so that a conductor cross section 23 of the single line 61 of 35 mm$^2$ is obtained. An insulation element, preferably composed of TPE or EPDM, surrounds the conductor braid 2 and completes the single line 61. The single line 62 is of the same design. In the charging cable 12 there are not only two such single lines 61, 62 but also six signal cables 101 with a conductor cross section 1013 of 0.75 mm$^2$, which are arranged around a filler 11 and are held together with a common sheath 10. The cable also comprises two hoses 81, each with a 4 mm internal diameter, and said cable also comprises a neutral conductor 9 with 16 mm$^2$ conductor cross section and two strands of filler 11. The arrangement is therefore implemented as described in FIG. 6c, but the hoses 81 for supplying the plug cooling system 146 are replaced by filler 11.

Figure 6D:
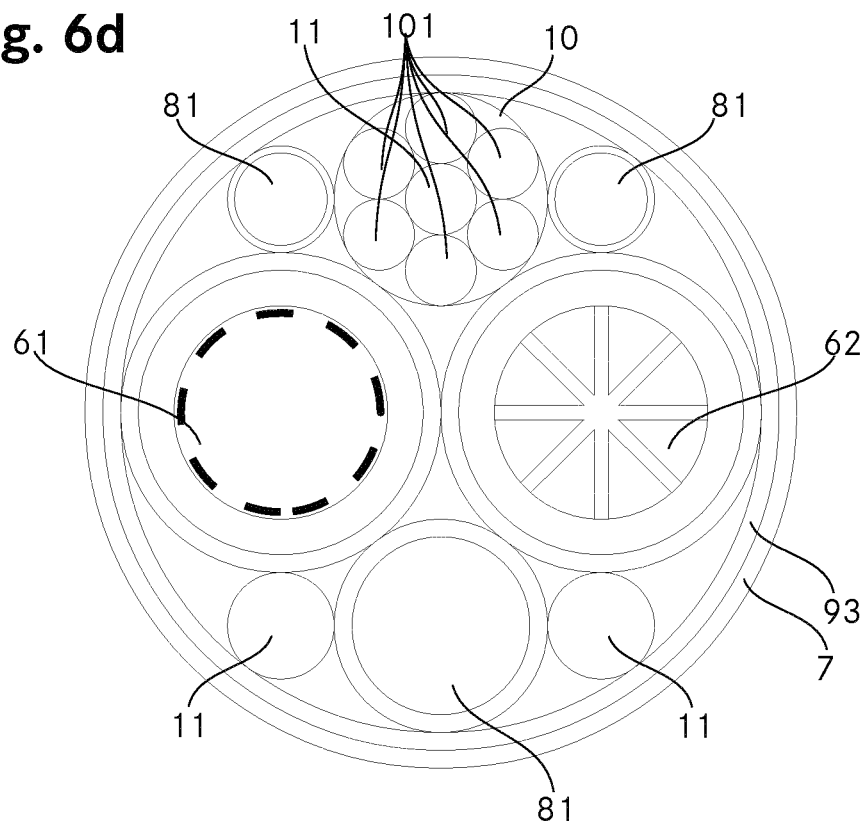
FIG. 6d shows a charging cable with two single lines, hoses, filler, signal cables and a neutral conductor braid.

FIG. 6d shows a further charging cable 12. It contains a first and a second single line 61, 62, three hoses 81, three strands of filler 11, six signal cables 101, a neutral conductor braid 93 and a protective sleeve 7. The six signal cables 101 are arranged around a strand of filler 11 and are held together with a sheath 10.

The signal cables 101, the strands of the filler 11, the hoses 81 and the single lines 61, 62 all have a round cross section. The protective sleeve 7 is in the form of a hollow circular cylinder. The neutral conductor braid 93, which is also in the form of a round hollow cylinder, bears on the inner side of said cylinder. In the interior of this hollow cylinder which is formed by the neutral conductor braid 93 there are the two single lines 61, 62 and all the other components of the charging cable. The internal radius of the neutral conductor braid 93 is equal to the diameter of a single line 61. The diameter of the two single lines 61, 62 is equal in size. The neutral conductor braid 93 is configured in such a way that it permits a slight increase in its internal radius. The sheath 10 and one of the hoses 81 have a diameter of approximately ⅔ of the diameter of the first single line 61. The two other hoses 81 and the two strands of filler 11 which are located outside the sheath 10 preferably have a diameter of approximately ⅓ of the diameter of the first single line 61.

In one preferred embodiment, a single line 6 has a helix 011 with a diameter of 4 mm, composed of chromium-nickel steel wire with a diameter of 0.6 mm as a support structure. The latter is surrounded by a plurality of layers of braid made of tin-plated copper wire, wherein the number of wires and the diameter of the wires are selected such that the conductor cross section 23 of the single line 6 is 35 mm$^2$. The wire layers extend in the radial direction at a distance of 2 mm to 4 mm from the central longitudinal axis of the single line 6. These conductors 22 are surrounded by an insulating element, preferably composed of EPDM or TPE, with a thickness of 2 mm, so that the single line 6 has a diameter of 12 mm.

In one preferred embodiment of a charging cable 12, there are two of these single lines 61, 62, two hoses 81 composed of polyurethane (PUR) with an external diameter of 4.0 mm and a hose 81 with an external diameter of 8.0 mm, wherein the wall thickness of the large hose 81 is 1 mm, and in the case of the small hoses 81 is 0.5 mm. The hose 81 with the 8.0 mm external diameter receives the cooling fluid 5, which has flowed through the ducts 4 of the two single lines 61, 62 and has cooled them. The hoses 81 with an external diameter of 4 0 mm serve as a forward line and return line for a plug cooling system 146. Furthermore the charging cable 12 comprises six signal cables 101, each with a conductor cross section 1013 of 0.75 mm² and a conductor diameter of 1 mm. The latter is surrounded by an insulating element 3 with a wall thickness of 0.5 mm. These six signal cables 101 are arranged around a filler 11, preferably composed of PP or PE, with a diameter of 2 mm. A sheath 10 with a thickness of 0.5 mm is arranged around the six signal cables 101. The entire arrangement is surrounded by a braid composed of copper wires with a diameter of 0.25 mm, wherein the braid forms a cylinder with an internal diameter of 24 mm. A protective sleeve 7 with a wall thickness of 2.75 mm surrounds everything, so that the charging cable 12 has in total a diameter of 30 mm. This charging cable 12 can be easily gripped. It contains a volume of 90.5 mm³ of copper per mm of length and a volume of 67.5 mm³ of water per mm of length when the charging cable 12 is operating with water as the cooling fluid 5. This results in a weight of slightly less than 1 g/mm of length of the charging cable or 1 kg/m of cable length. With cooling with warm water at 20° C. and a through-flow rate of 1.8l/min it is possible to transmit a current of 700 A over 7 m of length with this charging cable 12 without the surface becoming hotter than 50° C. when there is an ambient temperature of 20° C. Under the same conditions, almost 600 A can be transmitted without the charging cable 12 becoming hotter than 40° C. anywhere at its surface.

Figure 7:
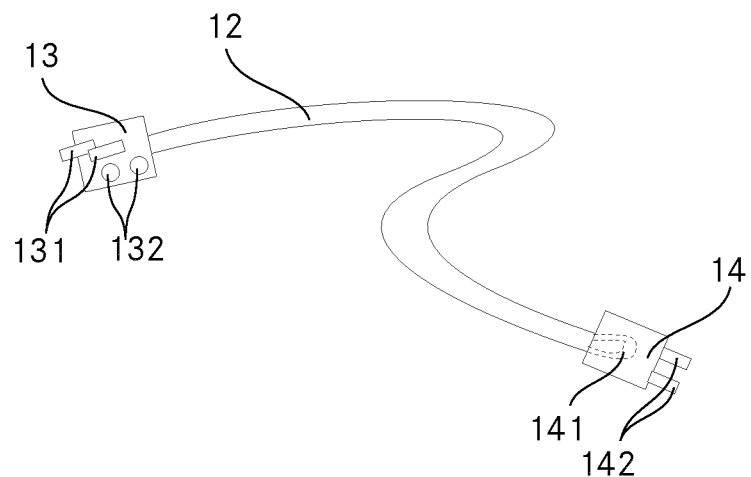
FIG. 7 shows a charging system.

FIG. 7 shows a charging system with a charging cable 12, a plug 14 and an end connection 13. The end connection 13 comprises electrical contacts 131 and a fluid feed line 132 for the cooling fluid 5. The fluid feed line 132 is configured in such a way that a pump or a line system which makes the cooling fluid 5 available with a desired pressure difference between the inflow and outflow of the fluid feed line 132. The electrical contacts 131 are configured in such a way that they can be connected to a power source which makes available the power to be transmitted. The plug 14 comprises in its interior a fluid return line 141 which receives cooling fluid 5 from one of the single lines 61, 62 and directs it into the other single line, or receives the cooling fluid 5 from both single lines 61, 62 and directs it into one hose 81 or two hoses 81 of the charging cable.

Furthermore, the plug 14 comprises electrical contacts 142 with which an electrical connection can be made to the energy store to be charged. The plug 14 can also comprise further contacts which are connected to signal cables 101 and via which an exchange of data can take place between the apparatuses which are connected to the charging cable 12.

Figure 8:
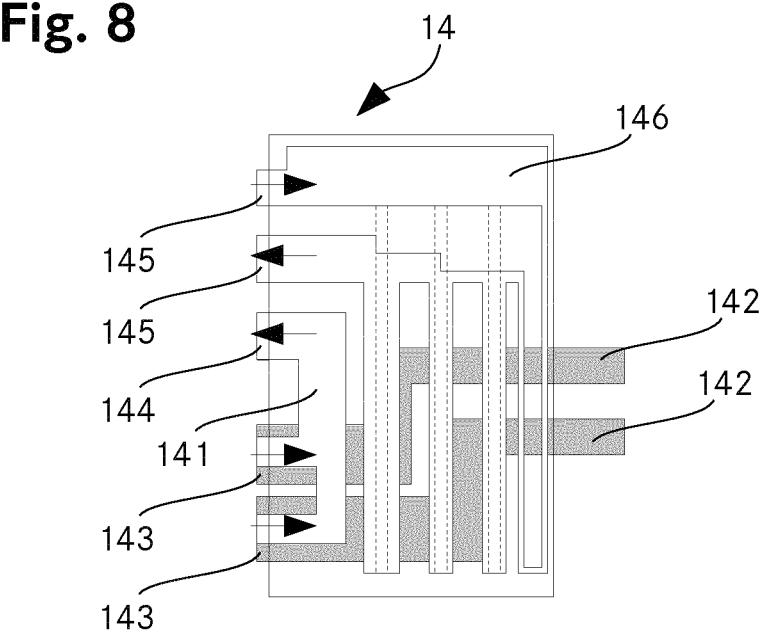
FIG. 8 shows a plug with a plug cooling system.

FIG. 8 shows a section through a plug 14 with a plug cooling system 146. The plug 14 comprises three connections for hoses 81 of the cable 145, 144 and two connections for single lines 143. The two connections for single lines 143 are shaped as pipes made of a material which has good conductivity. The conductor braid 2 and the conductors 21, 22 which, under certain circumstances, surround the conductor braid 2 are placed in contact with the pipe, for example by being positioned over the outer side of the pipe and clamped tight and/or soldered there. This clamping tight and/or soldering prevents the cooling fluid 5 from moving to the outer side of the pipe. The pipe preferably has an internal diameter which is approximately of the same size as or somewhat larger than the duct or ducts 4 of the single line 6 which is to be connected. The interior of the pipe is preferably fabricated from an electrically insulating material. The fluid enters the interior of the pipe. The pipe divides just behind the connection in the interior of the plug 14: the material of the pipe wall which has good conductivity is aggregated and adopts the desired shape of the electrical contact 142 at the plug output. The insulating material in the interior of the pipe forms a pipe which comes together with the pipe of the connection for the second single line 143 and finally brings about the connection for a hose 144. This is the fluid return line 141 of the plug 14. The connection for a hose 144 can be composed of a pipe which widens conically in the direction of the plug. The hose 81 can be pulled over this pipe and then clamped tight. The two other connections for hoses 145 can be configured in the same way. These connections constitute the forward flow and return flow for the plug cooling system 146. This is composed of one or more cooling lines which lead past those points of the plug 14 which are to be specifically cooled.

In summary it is to be noted that the line cross sections of the single lines 6, the neutral conductor 9 and the signal cables 101 can be selected to correspond to the respective requirements. Likewise, the arrangement of the components of the charging cable can be selected with adaptation to the requirements. It is therefore possible, for example, to integrate sensors into the charging cable 12, and a higher or lower number of signal cables 101 can be selected. In particular, strands of filler 11 can be replaced by signal cables 101, sensors, further hoses 81, further conductors for transmitting electrical power or unstructured filler material. The protective sleeve 7 can be reinforced, for example with electrically insulated rings or a wire helix in order to improve the roll-over strength further. It is also possible to provide further reinforcement around the protective sleeve 7. Instead of tin-plated copper it is also possible to use bare copper, copper alloys, aluminum or other conductive materials everywhere or only in parts of the single lines 6 and/or of the charging cable. Likewise, the hoses 81 can be composed of EPDM, nylon, polyamides or silicone. The wall thicknesses of insulating elements and hoses 81 can be selected according to the respective requirements. The material of the protective sleeve 7 and the material of the insulation element 3 of the single lines 61, 62 can be identical. The sheath 10 of the signal cables 101 can be dispensed with. The conductor braid 2 can be present in the form of a mat, instead of the form of a hollow cylinder, which mat is then wound to form a hollow cylinder. Wires and groups of wires can be replaced by straps or stranded conductors composed of a plurality of wires. The protective sleeve 7 does not have to be round but rather can adapt to the shape of the cable components or to external conditions.

The invention claimed is:
1. A single line (6) for a charging cable (12), comprising
a) an open support structure (011, 012) with a longitudinal extent,
b) a conductor braid (2) composed of conductors and
c) an insulation element (3),
wherein
d) the conductor braid (2) directly envelops the open support structure (011, 012) along its longitudinal extent, and
e) the insulation element (3) envelops the open support structure (011, 012) and the conductor braid (2), and
f) there is at least one duct (4) for a cooling fluid (5), and this duct (4) is formed by the support structure (011, 012) and the conductor braid (2), and g) wherein the insulation element (3) cannot be penetrated by the cooling fluid (5) and is electrically insulating.

2. The single line (6) as claimed in claim 1, wherein the conductor braid (2) is surrounded along its longitudinal extent by further conductors (21, 22) which are in electrical contact with the conductor braid (2) and are either configured themselves as one or more braids (22) which are arranged coaxially around the conductor braid (2) or the further conductors are twisted (21) around the conductor braid (2).

3. The single line (6) as claimed in claim 1, wherein the support structure is a helix (011) or an open profile (012).

4. The single line (6) as claimed in claim 3, wherein the support structure is a helix (011) made of metal.

5. The single line (6) as claimed in claim 1, wherein the conductors are wires.

6. The single line (6) as claimed in claim 5, wherein
a) a shape of the cross section of a convex sheath of the support structure (011, 012) remains essentially the same along the longitudinal extent of the support structure (011, 012), and
b) contact points of the support structure (011, 012) with their convex sheath form support structure lines, and
c) the angle (0113a, b) at which at least some of the wires of the conductor braid (2) intersect at least some of the support structure lines is between 45° and 135°.

7. The single line (6) as claimed in claim 3, wherein the support structure is an open profile (012) whose cross section remains constant in shape and size along the longitudinal extent, but this shape rotates about a longitudinal axis (0121) along the longitudinal extent.

8. A charging cable (12) comprising:
a) a first and a second single line (61, 62) as claimed in claim 1 and
b) a common protective sleeve (7).

9. The charging cable (12) as claimed in claim 8 also comprising:
a neutral conductor braid (93) which surrounds the first and second single lines (61, 62) and is covered by the common protective sleeve (7) or is integrated therein.

10. The charging cable (12) as claimed in claim 8, comprising:
at least one hose (81), two, three or four hoses (81), composed of a fluid-tight material, which hoses (81) are located within the common protective sleeve (7) but outside the first or second single line (61, 62).

11. The charging cable (12) as claimed in claim 8, comprising one or more of the following components: neutral conductor (9), covered signal cables (10, 101), hose (81), filler (11) and
a) each of these components has an essentially circular cross section and a circumscribing radius, and
b) the first and second single lines (61, 62) each have a round cross section, and the cross sections of the first and second single lines (61, 62) have the same circumscribing radius R, and
c) the circumscribing radius of each of the components which occur is less than or equal to ⅔ of the circumscribing radius R of the first single line (61).

12. A charging system comprising a charging cable (12) as claimed in claim 8, an end connection (13) and a plug (14),
a) wherein the end connection (13) comprises a fluid feed line (132) which feeds fluid into at least the duct (4) of the first single line (61) and receives fluid from the duct (4) of the second single line (62) and/or from at least one hose (81),
b) and the plug (14) comprises a fluid return line (141) which receives the fluid from at least the duct (4) of the first single line (61) and conducts it to the duct (4) of the second single line (62) and/or to the at least one hose (81).

13. The charging system comprising a charging cable (12) with a hose (81) as claimed in claim 12,
a) wherein the end connection (13) comprises a fluid feed line (132) which feeds fluid into the ducts (4) of the first and second single lines (61, 62) and receives fluid from at least one hose (81) of the charging cable (12),
b) and the plug (14) comprises a fluid return line (141) which receives the fluid from the ducts (4) of the first and second single lines (61, 62) and conducts it to the hoses (81).

14. The charging system as claimed in claim 12 comprising a charging cable (12) with at least two hoses (81) and a plug (14) with a plug cooling system (142),
wherein the plug cooling system (142) comprises at least one cooling line into which cooling fluid (5) can be introduced from one of the at least two hoses (81), and wherein this cooling fluid (5) can flow off again through another of the at least two hoses (81).

15. A single line (6) for a charging cable (12), according to claim 1, wherein the conductor braid (2) can be penetrated by the cooling fluid (5).

16. The single line (6) as claimed in claim 3, wherein the support structure is the open profile (012) with a star cross section.

17. The single line (6) as claimed in claim 3, wherein the support structure is a helix (011) made of copper or steel.

18. The single line (as claimed in claim 1, wherein the conductors are wires with a round cross section, composed of copper.

19. The single line (6) as claimed in claim 6, wherein the angle (0113a, b) at which at least some of the wires of the conductor braid (2) intersect at least some of the support structure lines is between 60° and 120°.

20. The charging cable (12) according to claim 11 wherein the circumscribing radius of the components which are present is essentially equal to ⅓ or ⅔ of the circumscribing radius R of the first single line (61).

* * * * *